United States Patent
Curtis et al.

(10) Patent No.: US 7,691,346 B2
(45) Date of Patent: Apr. 6, 2010

(54) PROCESS FOR RECAUSTICIZING CYANIDE LEACH SOLUTIONS

(75) Inventors: Starr Curtis, Phoenix, AZ (US); Jeff DiGulio, Henderson, NV (US); Jim Ramey, Mt. Vernon, MO (US)

(73) Assignee: Chemical Lime Company, Fort Worth, TX (US)

( * ) Notice: Subject to any disclaimer, the term of this patent is extended or adjusted under 35 U.S.C. 154(b) by 247 days.

(21) Appl. No.: 11/820,262

(22) Filed: Jun. 19, 2007

(65) Prior Publication Data

US 2008/0317649 A1 Dec. 25, 2008

(51) Int. Cl.
*C01G 3/00* (2006.01)

(52) U.S. Cl. .............................. 423/31; 423/29; 423/30; 423/379; 75/737; 75/732; 75/735; 75/741

(58) Field of Classification Search ........................ None
See application file for complete search history.

(56) References Cited

U.S. PATENT DOCUMENTS

| 2,705,185 | A | * | 3/1955 | Kamlet | 423/163 |
|---|---|---|---|---|---|
| 4,256,706 | A | | 3/1981 | Heinen et al. | 423/29 |
| 4,610,724 | A | | 9/1986 | Weir et al. | 75/118 |
| 4,708,804 | A | | 11/1987 | Coltrinari | 210/677 |
| 5,078,977 | A | * | 1/1992 | Mudder et al. | 423/1 |
| 5,116,417 | A | | 5/1992 | Walker, Jr. et al. | 75/327 |
| 5,186,915 | A | | 2/1993 | Polizzotti | 423/29 |
| 5,254,153 | A | | 10/1993 | Mudder | 75/732 |
| 5,336,474 | A | | 8/1994 | Diehl et al. | 423/29 |
| 5,676,733 | A | | 10/1997 | Kohr | 75/712 |
| 6,649,136 | B2 | * | 11/2003 | Ray et al. | 423/371 |
| 2008/0272047 | A1 | * | 11/2008 | Mellegard et al. | 210/384 |

* cited by examiner

*Primary Examiner*—Melvin C Mayes
*Assistant Examiner*—Melissa Stalder
(74) *Attorney, Agent, or Firm*—Charles D. Gunter, Jr.

(57) ABSTRACT

A method is shown for raising the pH of a cyanide leach solution of the type used in a heap leaching mining operation. Lime slurry is mixed with a side stream of barren cyanide solution in a reactor vessel in order to remove carbonate hardness, to regenerate the hydroxide alkalinity and to raise the pH of the resulting recausticized leach solution. A portion of the calcium carbonate precipitate formed in the reactor vessel is retained in order to encourage further crystal growth. Overflow from the reactor vessel passes through one or more cyclone separation stages in order to remove particulate solids. A cyclone overflow stream is directed back to the process to upwardly adjust the pH of the bulk of the barren cyanide solution. A cyclone underflow stream is directed back to the reactor vessel to provide seed crystal nuclei for precipitate growth. Periodically, precipitate grains are drained from the bottom of the reactor vessel, water-washed to recover cyanide solution, and discharged as carbonate sand and lime grit.

12 Claims, 1 Drawing Sheet

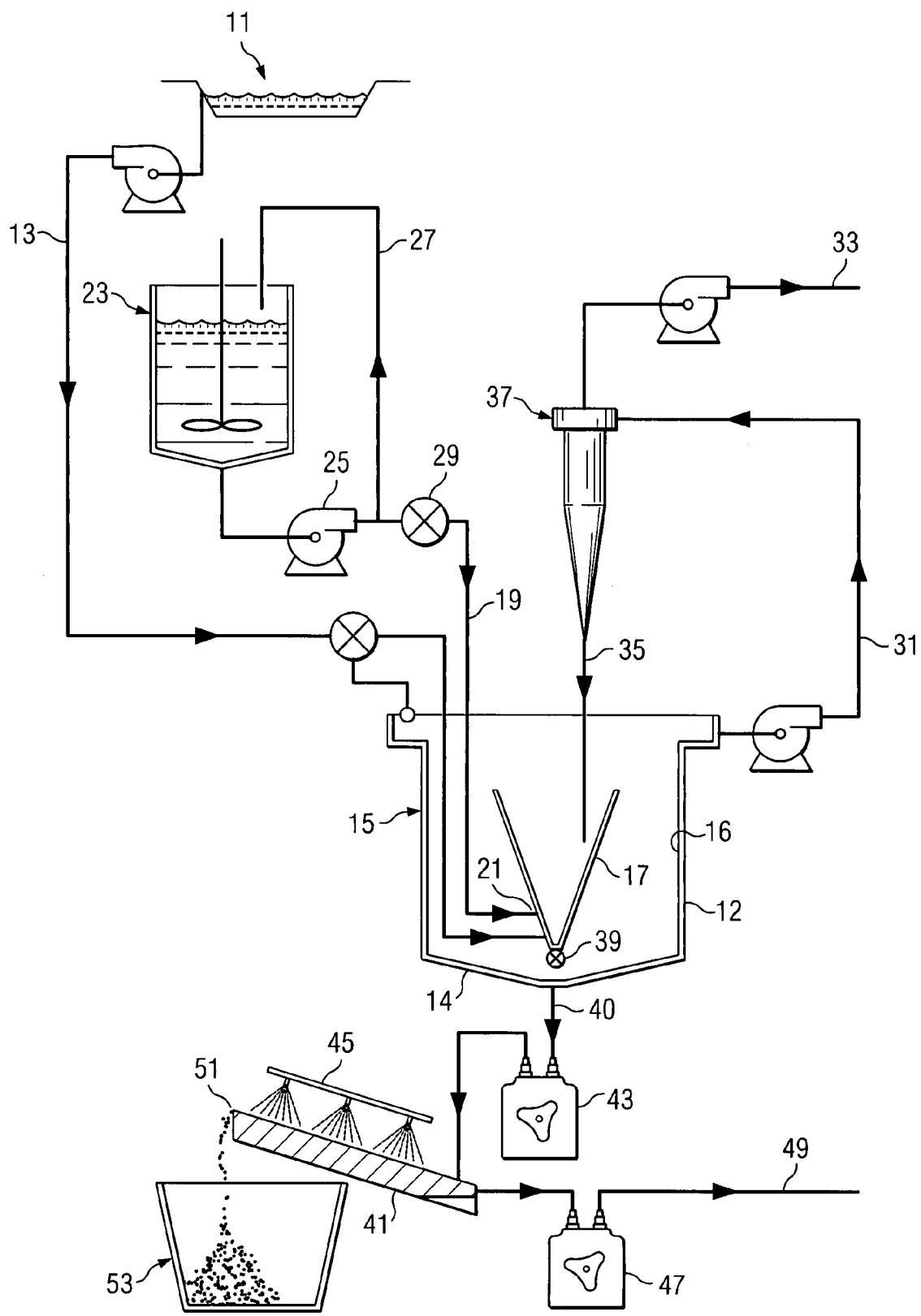

PROCESS FOR RECAUSTICIZING CYANIDE LEACH SOLUTIONS

BACKGROUND OF THE INVENTION

1. Field of the Invention

The present invention relates generally to cyanide leach solutions of the type used in heap leaching processes for the recovery of precious metal values from ores and to an improved method of using lime to raise the pH such cyanide leach solutions.

2. Description of the Prior Art

The recovery of precious metal values, such as gold and silver, through the heap-leaching of low grade ores and tailings from other recovery processes is well known. In general, the procedure comprises spraying, trickling, pouring on, or otherwise applying an aqueous alkali cyanide solution to a pile of low grade ore or tailings. The aqueous alkali cyanide solution, e.g., aqueous calcium, sodium or potassium cyanide, permeates and percolates through the pile, thereby extracting the metal values as a cyanide complex. The resultant metal cyanide complex-bearing liquor is recovered from the bottom of the pile and is typically sent to an extraction and recovery facility. For example, the metal cyanide complex may be separated by adsorption on a column of activated carbon. The metal cyanide complex-bearing carbon particles are then further treated, as by electrowinning, to separate and recover the elemental metal value. The entire leaching process can sometimes take up to several weeks to finalize. Heap leaching is a relatively low cost process, and is usually most profitable when used on low grade ores.

The process of spraying, trickling, pouring on, or otherwise applying an aqueous alkali cyanide solution to a pile of low grade ore or tailings, referred to herein as cyanidation, is most common techniques for extracting gold from low grade ore. As has been briefly mentioned, when using cyanidation, heap leach gold mining operations employ dilute alkaline cyanide solutions to dissolve and transport the precious metals from the crushed ore on the leach pad to the recovery plant. The chemical reaction is referred to as the Elsner Reaction, and has a stoichiometry of:

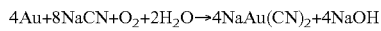

$$4Au+8NaCN+O_2+2H_2O \rightarrow 4NaAu(CN)_2+4NaOH$$

Generally speaking, the cyanide heap leaching process begins with a supply of raw crushed ore, containing the precious metal values, being fed to a selected one of a cyanide leach solution pond and leach pad. The discussion which follows will use the example of a leach pad for sake of illustration. Leach pads range in size from small to large, whereby the largest pads are several hundred yards in length and width. In order to prepare the pad site, the ground is leveled and sloped toward a collection pond. A plastic liner is laid on top of a clay layer, and a layer of crushed ore is laid down to protect the liner. Now the leach pad is ready to receive heaped ore, which may be loaded onto the pad by trucks or conveyors. Once the pad has built up to some depth, for example 10 meters, a sprinkler system is installed on top of the leach pad. Next, a weak cyanide solution, referred to as the barren solution, is sprinkled over the leach pad. As the solution percolates through the heap, it dissolves the gold. The gold-bearing solution, referred to as the pregnant solution, then travels along the liner to the collection pond.

Although cyanidation is a commonly practiced technique, several known problems sometimes occur during the cyanidation of ore to recover gold and silver. Precious metals may become locked so that cyanide solutions cannot penetrate and dissolve them appropriately, leading to long leach times. Additionally, strongly adherent films on the surface of native gold and silver form during the leaching process, inhibiting or preventing further dissolution of the metals. Also, current cyanidation techniques usually require high cyanide consumption. It is even possible for the leach solution to foul, rendering it inactive for precious metal dissolution and often causing difficulties in metal precipitation from pregnant solution.

One particular problem with cyanidation is the possibility of forming toxic gases during the precipitation of precious metal from the pregnant leach solution. If the pH of the cyanide leach solution drops below about 9.3, the leach solution begins to lose hydrogen cyanide (HCN) to the air. A strong alkaline agent, like lime or caustic, is needed to maintain a cyanide-protective pH above 9.5. In some instances, the leach solution pH and alkalinity is controlled with caustic soda (NaOH). However, it is expensive to provide caustic soda in large amounts or over a continuous period of time. Replenishment of the alkalinity of the leach solution is essential because alkaline leach solutions absorb carbon dioxide from the air, converting the hydroxide alkalinity (as caustic soda) to carbonate alkalinity (as sodium carbonate), shown through the following stoichiometries:

Carbonic acid formation: $H_2O+CO_{2,gas} \leftrightarrows H_2CO_{3,aq}$

Dissolved sodium carbonate formation: $2NaOH+H_2CO_{3,aq} \leftrightarrows Na_2CO_{3,aq}+2H_2O$ Overall alkalinity destruction reaction: $2NaOH+CO_2 \leftrightarrows Na_2CO_{3,aq}+H_2O$ As mentioned, it is critical to avoid the release of cyanide as hydrogen cyanide due to the high toxicity of this gas. Cyanide ions may become hydrogen cyanide gas when they acquire free protons, as shown by:

$$CN^-+H^+=HCN_{(g)}$$

Therefore, the free proton concentration is kept low by the addition of alkali such as lime or sodium hydroxide. Currently, quicklime is usually added with the crushed ore when loading the leach pads. However, when mining and leach pad loading are completed, there is no easy way to add lime to the pads since it hydrates to a pasty mass, interfering with good distribution of leach liquors. U.S. Pat. No. 4,256,706 teaches the percolation leaching of gold or silver ores by a process comprising initial agglomeration of fines in the feed by means of a binding agent and cyanide solution, followed by aging, and subsequently, leaching to recover gold or silver values. Also, the addition of lime to cyanide solutions is taught.

U.S. Pat. No. 5,336,474 also teaches a process for the leaching of gold and silver from ores and ore concentrates through contact of the ore with an aqueous leach solution containing cyanide. In addition, lime is introduced in order to adjust the pH, keeping it in levels around 8 to 13. Several pretreatment and oxidation stages are also used in this particular precious metals recovery process. The problem of fine agglomeration is addressed in a number of the prior art references. For example, U.S. Pat. No. 5,186,915 shows an agglomerating agent and method for use in heap leaching of mineral bearing ores in which a moderate to high molecular weight anionic polymer in combination with lime is used as an agglomerating agent.

During the pH adjustment of the cyanide solution through the addition of alkali, particulate solids are sometimes formed and need to be separated from the main process. If the particulate solids are not separated, the system plumbing frequently becomes plugged. There are several teachings that include separation stages in order to remove particulate solids. For example, U.S. Pat. No. 5,676,733 teaches the use of hydrocyclones during the heap leaching process of recovering precious metal values from refractory sulfide ores in order to remove the particulate solids. This method does not include the addition of lime, however.

Despite improvements of the above type in heap leach processes using alkaline cyanide solutions, a need continues to exist for further improvements in maintaining the desired pH level of the cyanide leach solution.

A need continues to exist for an improved process for using lime to raise the pH of such cyanide leach solutions, where the process more efficiently and economically regenerates hydroxide alkalinity and raises the pH levels of the cyanide leach solutions.

A need also exists for an improved process of the above type which uses lime to raise the pH of the cyanide leach solutions, which process also removes calcium carbonate precipitate without scaling or plugging the distribution system plumbing.

SUMMARY OF THE INVENTION

The objects of the present invention are accomplished by providing an improved method for using lime to raise the pH of a cyanide leach solutions of the type used in heap leach mining operations. The method of the invention has the added advantage of recausticizing the barren leach solution to the desired pH range, while removing calcium carbonate precipitate without scaling or plugging the distribution system plumbing used in the system.

In the method of the invention, a supply stream of barren cyanide solution is provided from a suitable source, such as a leach pond. A side stream of the supply stream of barren cyanide solution is channeled to a reactor vessel. Crystal growth is encouraged within the reactor tank while introducing a source of lime slurry to the reactor tank, the lime slurry reacting with contents of the reactor vessel to form calcium carbonate precipitate. The calcium carbonate precipitate is initially retained, in the form of particulate solids, within the reactor vessel.

Overflow from the reactor vessel is pumped from the reactor vessel through a cyclone separation stage which removes particulate solids and creates an overflow stream and an underflow stream. The cyclone overflow stream is directed back to the source of barren cyanide solution to upwardly adjust the pH of the bulk of the barren cyanide solution. The cyclone underflow stream is directed back to the reactor vessel to thereby provide seed crystal nuclei for precipitate growth within the reactor vessel. The pH of the barren cyanide leach solution is adjusted to a pH level that is just below calcium hydroxide saturation at a given temperature (e.g., 12.45 at 25° C.) by combining at least a portion of the cyclone overflow stream with the source of barren cyanide solution.

The introduction of lime slurry to the reactor vessel produces a reaction among the vessel contents in which sodium carbonate is converted to sodium hydroxide and calcium hydroxide is converted to calcium carbonate as the mineral precipitate. Calcium ions are intentionally precipitated in the reactor vessel in the form of calcium carbonate, whereby any lime scaling occurs in a controlled space and not in subsequently encountered barren solution lines located downstream of the reactor vessel.

The cyclone separation stage is preferably accomplished through the use of a hydrocyclone which limits any free lime discharged in the resulting causticized overflow stream to very fine particles that give a strong increase in pH levels when the causticized stream is mixed with the bulk of the barren cyanide solution. The reaction between the lime slurry and the reactor contents produces a causticized barren solution in the reactor vessel, and wherein the hydrocyclone separates all coarse particles present in the causticized barren solution, whereby lime grit, calcium carbonate precipitate and any other coarse impurities are rejected from the hydrocyclone overflow and settle downwardly within the reactor tank for removal. The removal of lime grit and calcium carbonate precipitates in the hydrocyclone step effectively prevents plugging of lines, pumps, or emitters used in the heap leaching process.

In a preferred form of the method of the invention, the settled precipitate settles in a bottom region of the reactor vessel and is periodically released onto an inclined grit screw. The inclined grit screw allows space and time for the washing of cyanide liquor out of the coarse solids present in the precipitate, thereby producing a diluted cyanide solution and washed grit. The diluted cyanide solution can be recycled in the process, while the wash grit can be discharged in a water-moist condition for disposal. At least a portion of the grit and calcium carbonate precipitate grains are retained in the reactor vessel to act as nuclei for further precipitation and particle growth, to thereby provide efficient removal and washing of waste solids from the system.

At the conclusion of the described method steps of the present invention, a clean supply of cyanide solution, with raised pH, is available for a cyanidation heap leaching process.

Additional objects, features and advantages will be apparent in the written description which follows.

BRIEF DESCRIPTION OF THE DRAWINGS

FIG. 1 is a schematic flow diagram of the cyanide leach solution recausticiaztion process of the present invention.

DETAILED DESCRIPTION OF THE INVENTION

The present invention is directed towards a method for using lime to raise the pH of cyanide leach solutions of the type used in heap leach mining operations for the recovery of precious metal values. In addition to providing a "recausticized" barren cyanide solution, the method removes calcium carbonate precipitate without scaling or plugging the distribution system plumbing, thereby providing a clean and causticized cyanide leach solution having the desired pH needed for use in a heap leach mining process.

The term "lime" as used in this discussion will be taken to mean both quicklime (calcium oxide) and hydrated lime (calcium hydroxide). Quicklime is produced by heating limestone (calcium carbonate) in a kiln at extreme temperatures to "calcine" the material and thereby drive off carbon dioxide. Quicklime is usually in the form of lumps or pebbles. The lime may have impurities but will ordinarily be better than 90% calcium oxide or calcium hydroxide, depending on the type of limestone used. In order to further process lime and improve the ease with which it is handled, quicklime is typically mixed with water to form a slurry in what is referred to in the industry as a "slaking" operation. In the case of quicklime, the water reacts with the quicklime in an exothermic reaction to form a hydrated lime slurry. For purposes of the present invention, the amount of lime solids in the slurry may range between about 5-45% by weight to that of the total lime slurry.

Lime slurries can be made in batches or in a continuous process. If a particular user requires a large amount of lime slurry at a particular site, large capacity slaking and storage tanks can be permanently located on the site. These tanks can usually provide a sufficient supply of lime and lime slurry for most operations. In other situations, portable equipment for forming lime slurries which can be moved from site to site has been developed.

The source of lime slurry used in the present invention can thus be obtained from any source customary in the industry. For example, U.S. Pat. No. 5,507,572, issued Apr. 16, 1996, and assigned to the assignee of the present invention describes a "Method And Apparatus For Supplying A Continuous Product Stream Of Lime Slurry To A Remote Jobsite." The apparatus and method steps described in that reference describe a portable unit which can be used to supply the source of lime needed for the purposes of practicing the present invention.

With reference now to FIG. 1 of the drawings, there is shown in schematic fashion the present method of using lime to raise the pH of a cyanide leach solution of the type used in heap leach mining operations to recover precious metal values from ore. In the first step of the method, a supply of barren cyanide solution is provided from a suitable source. The source will customarily be a leach pond 11 which is already present at the heap leaching operation. As discussed in the Description of the Prior Art, this leach solution pond will eventually be used to supply a source of cyanide solution to a leach pad containing heaped crushed ore in order to leach precious metals from the ore. The present invention seeks to provide a clean cyanide leach solution with an environmentally safe pH level, before it reaches the heap leaching process. The general heap leaching process is well understood by those skilled in the relevant arts and is described in a number of prior art references. For example, the previously mentioned U.S. Pat. No. 4,256,706, teaches the percolation leaching of gold or silver ores through the use of a binding agent and cyanide solution, followed by aging, and subsequently, leaching to recover gold or silver values.

A side stream 13 of barren cyanide solution is next channeled from the leach pond 11 and passes to a suitable reactor vessel 15. In the embodiment of the invention illustrated in FIG. 1, the vessel 15 has cylindrically shaped sidewalls 12 and a sloped bottom 14 which define an interior 16 having interior contents. A conically-shaped crystal growth cone 17 located within the interior of the reactor vessel 15 promotes crystal growth within the reactor, as will be further explained. In addition to the side stream of barren cyanide 13, a source of lime slurry 19 is introduced into the reactor vessel, at the approximate location illustrated at 21 in FIG. 1. The lime component caustically reacts with the reactor contents to thereby form a mineral precipitate in the interior of the reactor vessel. More specifically, sodium carbonate is converted to sodium hydroxide and calcium hydroxide is converted to calcium carbonate precipitate in the reactor vessel. The lime source 19 is supplied from a lime slurry vessel 23 with pump 25, circulating line 27 and bleed valve 29. As previously explained, the lime slurry may be produced by slaking quicklime with water (an exothermic reaction), or by mixing hydrated lime with water. The lime slurry is stored in an agitated lime slurry vessel 23.

The calcium carbonate precipitate is retained and recirculated in the reactor vessel 15 until the precipitate particles are large enough to settle out of the stirred water. The majority of the calcium carbonate precipitate is segregated from the bulk of the solution using one or more cyclonic separation stages. FIG. 1 illustrates one cyclonic separation stage in the form of hydrocyclone 37. An overflow 31 from the reactor vessel 15 is pumped through the cyclone separation stage to remove particulate solids and also create an overflow stream 33 and an underflow stream 35. The underflow stream 35 is recycled back to the reactor vessel 15, and specifically to the interior of the conically-shaped crystal growth cone 17 to provide seed crystal nuclei for precipitate growth. The discharge from the growth cone 17 is located adjacent the bottom region of the reactor vessel interior. The overflow stream 33 is directed back to the barren cyanide solution leach pond 11 to upwardly adjust the pH of the bulk of the barren cyanide solution. The pH of the causticized barren solution can be adjusted to high levels (greater or equal to pH of 13) depending on the sodium carbonate content of the untreated barren solution. Since pH is a logarithmic function, a small fraction (~1%) of the total barren solution flow volume can be lime-treated to produce a high-pH causticized solution, which is then mixed with the bulk of the barren solution stream to raise the overall solution pH.

The optimum pH for this causticizing system is just below calcium hydroxide saturation, e.g., 12.45 pH at 25° C. Operating just below 12.45 pH has several advantages. Below pH 12.45, the lime particles should fully dissolve (at equilibrium). Undissolved lime particles that reach the hydrocyclone 37 will be segregated, whereby coarse particles will return to the reactor with the hydrocyclone underflow. However, fine particles (less than about 30 µm) remain in the hydrocyclone overflow stream 33. These fine lime particles will dissolve readily and rapidly when mixed with the bulk of the cyanide leach solutions. Also, while operating just below 12.45 pH, a smaller volume of causticized solution is needed to adjust the pH of the bulk of the leach liquor than operating at a lower pH. Operating at higher pH, on the other hand, generally risks discarding unreacted lime with the precipitate and provides too many nuclei for calcium carbonate precipitation.

In addition to raising the pH of the target cyanide leach solution, the method of the present invention allows the pH of cyanide leach solution to be raised in a specific and controlled environment, while avoiding precipitation or scaling in the distribution lines of the system. This can be conveniently accomplished as follows: A valve 39 at the base of the growth cone 17 in the reactor vessel 15 is provided to periodically drain the calcium carbonate precipitate grains from the bottom of the reactor vessel 15 through a discharge line 40, dropping coarse precipitate onto an inclined grit screw 41 or other separation device. Movement of the coarse precipitate can be encouraged by providing a pump means, such as peristaltic pump 43, which assists in moving settled precipitate onto the surface of the grit screw 41. Next, water sprays 45 wash the precipitated calcium carbonate located on the grit screw 41, discharging the precipitate grains as carbonate sand and lime grit. The wash water may be conveniently recycled by routing it back to the lime slurry vessel 23 by means of another peristaltic pump 47 and discharge channel 49. Once the precipitate reaches the end of the inclined grit screw, shown as location 51, it is released to fall into a grit and precipitate disposal container 53. The grit retained in the disposal container 53 is thereby removed from the process, eliminating the possibilities of plugging or scaling the distribution plumbing once the wash water is recycled into the lime slurry vessel 23.

In operation, the hydrocyclone separates all coarse particles from the product causticized barren solution. As mentioned, the hydrocyclone limits any free lime discharged above 12.45 pH, at 25° C., to very fine particles. Unreacted fine lime particles that pass through the hydrocyclone give a strong increase in pH when they react in the bulk of the barren cyanide solution. These react fully when the causticized solution is mixed with the rest of the barren solution. Free lime that is discharged at a pH greater than 12.45 reacts with the carbonate ions dissolved in the cyanide solution. Dissolved calcium ions precipitate as calcium carbonate in the reactor or in the mixing basin so that lime scaling occurs in these controlled spaces, not in the barren solution lines or emitters.

Lime grit, calcium carbonate precipitate and other coarse impurities are rejected from the cyclone overflow and report back to the reactor vessel for removal. As a result, the overflow is a clean high pH causticized cyanide leach solution. The coarse precipitate and grit settle to the bottom of the reactor tank and are removed to the grit screw. The inclusion of the inclined grit screw gives space and time to wash the cyanide solution out of the coarse solids. This diluted cyanide solution is recycled back to the process while the wash grit is discharged in a water-moist condition for disposal. Another important feature of the present invention involves the reactor chamber retaining the grit and calcium carbonate precipitate grains to act as nuclei for further precipitation and particle growth. This is essential for efficient removal and washing of waste solids from the system. The pH control of the barren cyanide leach solution is achieved by proportional mixing of the causticized stream and the bulk of the leach solution.

An invention has been provided with several advantages. The present invention provides an economical alternative to previously employed processes for raising the pH of cyanide leach solutions by substituting lime for more expensive sodium hydroxide. Additionally, the method of the present invention removes the hydroxide-consuming dissolved carbonic acid salts by calcium carbonate precipitation. This carbonic acid forms naturally when cyanide leach solutions are applied to the leach pads and are exposed to air containing carbon dioxide. Furthermore, the present invention provides a potentially improved quality of leach solutions by removing metal ions such as Sr, Ba, Co, Cu, Fe and As by coprecipitation as carbonates or by adsorption. This may facilitate a faster closure and remediation by the removal of metal ions from the large volume of leach solutions. Substituting lime for sodium hydroxide for alkalinity reduces the build-up of sodium in the leach solution. Furthermore, sodium remains in solution after the cyanide ion is destroyed, but calcium will precipitate as calcium carbonate. This lowers the dissolved solids content of the solution which helps meet closure requirements.

The method of the present invention allows the pH of cyanide leach solutions to remain in acceptably safe ranges by the regeneration of hydroxide alkalinity of cyanide solutions through lime softening. In addition, it accomplishes this without plugging the system plumbing. Furthermore, a controlled environment is provided for the precipitation of calcium carbonate in the reaction vessel instead of pipes or drip irrigation emitter lines and heads. Similarly, the removal of lime grit and calcium carbonate precipitates with a hydrocyclone prevents plugging of lines, pumps, or emitters. Discharge of harmless sandy to silty grit after removal of dissolved cyanide by water washing is important to both workers and surrounding environmental locations.

While the invention has been shown in only one of its forms, it is not thus limited but is susceptible to various changes and modifications without departing from the spirit thereof, as described in the claims which follow.

What is claimed is:

1. A method of using lime to raise the pH of a cyanide leach solution used in a heap leach mining operation to recover precious metal values from ore and to thereby produce a recausticized leach solution, the method comprising the steps of:
    providing a supply of barren cyanide solution from a suitable source;
    channeling a side stream from the supply of barren cyanide solution to a reactor vessel;
    encouraging crystal growth within the reactor vessel while introducing a source of lime slurry to the reactor vessel, the lime slurry reacting with contents of the reactor vessel to form a mineral precipitate;
    initially retaining the mineral precipitate, in the form of particulate solids, within the reactor vessel;
    pumping overflow from the reactor vessel through a cyclone separation stage which removes particulate solids and creates an overflow stream and an underflow stream;
    directing the cyclone overflow stream back to the source of barren cyanide solution to upwardly adjust the pH of the bulk of the barren cyanide solution;
    directing the cyclone underflow stream back to the reactor vessel to thereby provide seed crystal nuclei for precipitate growth within the reactor vessel
    wherein the cyclone separation stage is accomplished through the use of a hydrocyclone which limits free lime which is discharged in the resulting causticized overflow stream to very fine particles that give a strong increase in pH levels when the causticized stream is mixed with the bulk of the barren cyanide solution; and
    wherein the pH of the barren cyanide leach solution is adjusted to a pH level that is below calcium hydroxide saturation at a given temperature by combining at least a portion of the cyclone overflow stream with the source of barren cyanide solution, the pH being about 12.45 pH at 25° C.

2. The method of claim 1, wherein the introduction of lime slurry to the reactor vessel produces a reaction among the vessel contents in which sodium carbonate is converted to sodium hydroxide and calcium hydroxide is converted to calcium carbonate as the mineral precipitate.

3. The method of claim 2, wherein calcium ions are intentionally precipitated in the reactor vessel in the form of calcium carbonate, whereby any lime scaling occurs in a controlled space and not in subsequently encountered barren solution lines located downstream of the reactor vessel.

4. The method of claim 3, wherein the reaction between the lime slurry and the reactor contents produces a causticized barren solution in the reactor vessel, and wherein the hydrocyclone separates all coarse particles present in the causticized barren solution, whereby lime grit, calcium carbonate precipitate and any other coarse impurities are rejected from the hydrocyclone overflow and settle downwardly within the reactor vessel for removal.

5. The method of claim 4, wherein the removal of lime grit and calcium carbonate precipitates in the hydrocyclone step effectively prevents plugging of lines, pumps, or emitters used in the process.

6. The method of claim 4, wherein the settled precipitate settles in a bottom region of the reactor vessel and is periodically released onto an inclined grit screw.

7. The method of claim 6, wherein the inclined grit screw allows space and time for the washing of cyanide liquor out of the coarse solids present in the precipitate, thereby producing a diluted cyanide solution and wash grit, and wherein the diluted cyanide solution is recycled, while the wash grit is discharged in a water-moist condition for disposal.

8. The method of claim 7, wherein the reactor vessel retains at least a portion of the grit and calcium carbonate precipitate grains to act as nuclei for further precipitation and particle growth, to thereby provide efficient removal and washing of waste solids from the system.

9. A method of using lime to raise the pH of a cyanide leach solution used in a heap leach mining operation to recover precious metal values from ore and to thereby produce a recausticized leach solution, the method comprising the steps of:

provntroducing a supply of barren cyanide solution from a suitable source;

channeling a side stream from the supply of barren cyanide solution to a reactor vessel;

encouraging crystal growth within the reactor vessel while introducing a source of lime slurry to the reactor vessel, the lime slurry reacting with contents of the reactor vessel to form calcium carbonate precipitate;

initially retaining the calcium carbonate precipitate, in the form of particulate solids, within the reactor vessel;

pumping overflow from the reactor vessel though a hydrocyclone separation stage which removes particulate solids and creates a hydrocyclone overflow stream and an underflow stream;

directing the cyclone overflow stream back to the source of barren cyanide solution to upwardly adjust the pH of the bulk of the barren cyanide solution;

wherein the reactor vessel has sidewalls and a bottom which define a vessel interior, and wherein a conically-shaped crystal growth chamber is formed within the vessel interior, and wherein the cyclone underflow stream is directed back to the conically shaped crystal growth chamber within the reactor vessel, to thereby provide seed crystal nuclei for precipitate growth within the reactor vessel wherein the reaction between the lime slurry and the reactor contents produces a causticized barren solution in the reactor vessel, and wherein the hydrocyclone separates all coarse particles present in the causticized barren solution, whereby lime grit, calcium carbonate precipitate and any other coarse impurities are rejected from the hydrocyclone overflow, but instead pass though the conically-shaped chamber in the reactor vessel, settling toward the bottom of the reactor vessel for ease of removal;

wherein the settled precipitate which settles at the bottom of the reactor vessel and is periodically released onto an inclined grit screw; and wherein the reactor vessel retains at least a portion of the grit and calcium carbonate precipitate grains to act as nuclei for further precipitation and particle growth, to thereby provide efficient removal and washing of waste solids from the system.

10. The method of claim 9, wherein the pH of the barren cyanide leach solution is adjusted to a target pH level that is somewhat below calcium hydroxide saturation at a given temperature by combining at least a portion of the cyclone overflow stream with the source of barren cyanide solution.

11. The method of claim 10, wherein the cyclone separation stage is accomplished through the use of at least one hydrocyclone which limits free lime which is discharged in the resulting causticized overflow stream to very fine particles that give a strong increase in pH levels when the causticized stream is mixed with the bulk of the barren cyanide solution.

12. The method of claim 11, wherein the inclined grit screw allows space and time for the washing of cyanide liquor out of the coarse solids present in the precipitate, thereby producing a diluted cyanide solution and wash grit, and wherein the diluted cyanide solution is recycled, while the wash grit is discharged in a water-moist condition for disposal.

* * * * *